Nov. 12, 1929.　　　P. A. ROBBINS　　　1,735,795
FRUIT GRADER
Filed Dec. 10, 1928　　2 Sheets-Sheet 1

Inventor
P. A. Robbins
by J. Edw. Maybee
ATTY

Nov. 12, 1929.  P. A. ROBBINS  1,735,795
FRUIT GRADER
Filed Dec. 10, 1928  2 Sheets-Sheet 2
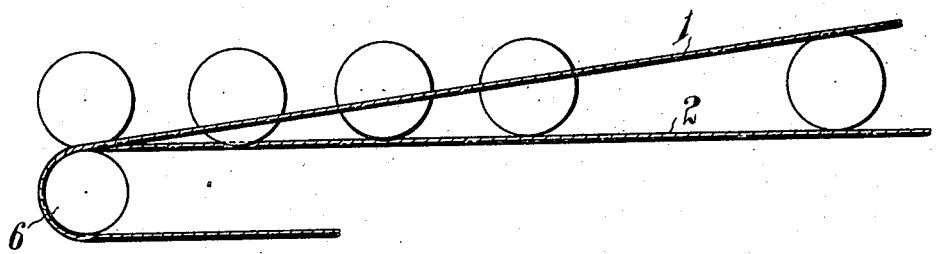
Fig. 5.
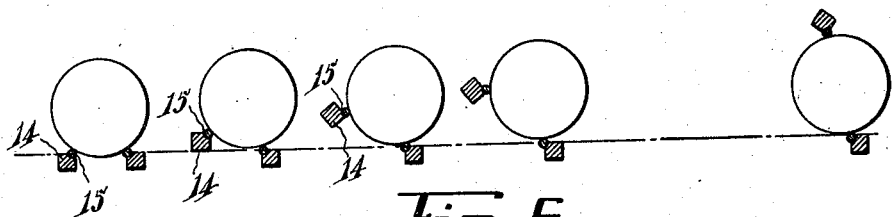
Fig. 6.
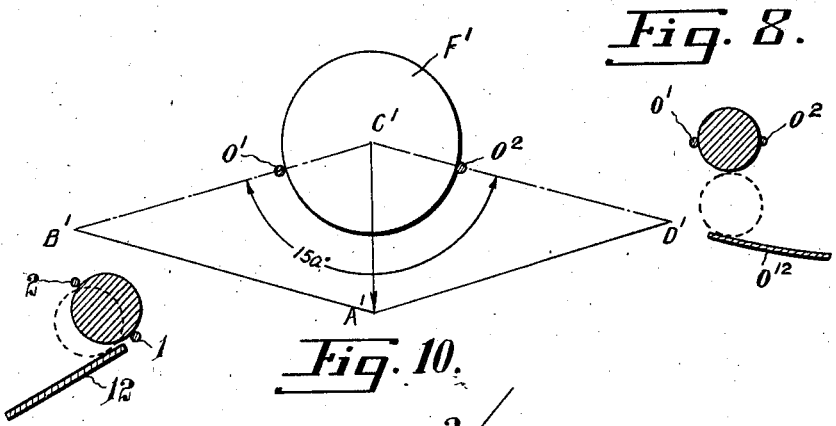
Fig. 8.
Fig. 9.
Fig. 10.
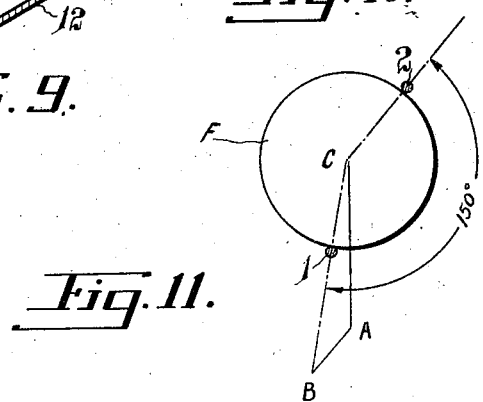
Fig. 11.
Inventor
P. A. Robbins
by J. Edw. Maybee
ATTY.

Patented Nov. 12, 1929

1,735,795

UNITED STATES PATENT OFFICE

PERCY A. ROBBINS, OF HIGHLAND PARK, ILLINOIS

FRUIT GRADER

Application filed December 10, 1928. Serial No. 325,052.

This invention relates to graders for fruit and the like. Heretofore it has been the general practice to employ travelling bands or belts on which the fruit is conveyed. These belts lie in a horizontal plane but diverge from one another so that the fruit will fall through the gradually widening space between the belts. Another arrangement is to employ parallel belts of progressively increased lengths to increase the spaces between the belts. In either case the fruit is held between the belts by an angle of nip and just before reaching a point where the angle of nip is 180 degrees, at about which point the belts release the fruit, a high pressure is imposed between the belts and the fruit which mars delicate fruits or those with tender skins. Another objectionable feature of the above described types of graders is that the fruit, when released by the belts, must drop a distance below the belts sufficient to provide clearance to permit the fruit to roll out of the grader from beneath the belts. This drop results in the fruit being bruised. The object of the present invention is to provide a grader of simple construction which will overcome the above objectionable features.

I attain my object by providing belt conveyors which are spaced apart horizontally and diverged vertically whereby the pressure between the belts and the fruit carried thereby is reduced to a minimum and the fruit, when released, merely rolls on to a chute located close to the lower belt.

The constructions are hereinafter more fully described and are illustrated in the accompanying drawings in which—

Figure 1:
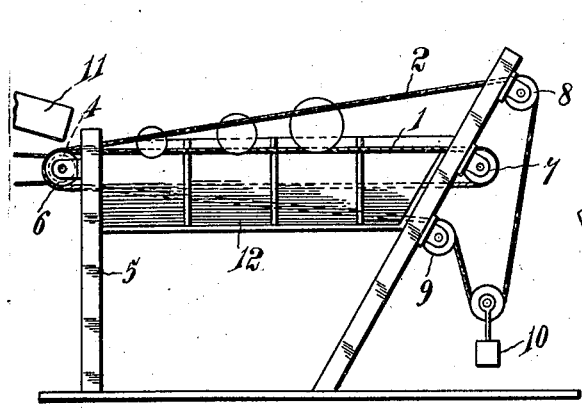
Figure 2:
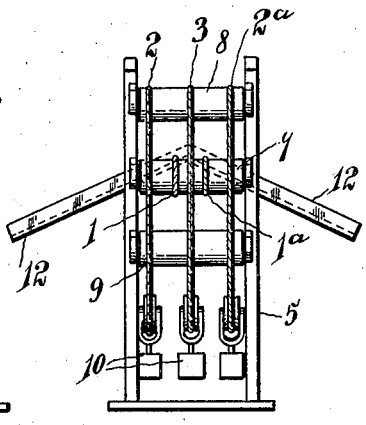
Figure 3:
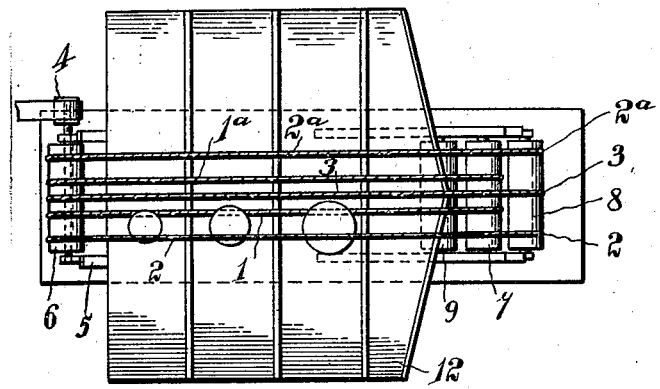
Figure 4:
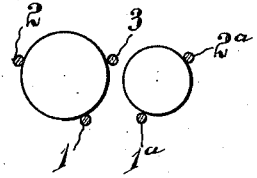
Figure 7:

Fig. 1 is a side elevation of my grading apparatus;

Fig. 2 an end view thereof;

Fig. 3 is a plan view of Fig. 1;

Fig. 4 a cross section of the belts shown in Fig. 1;

Fig. 5 a diagrammatic view showing five progressive positions of a piece of fruit;

Fig. 6 a cross section through each of the positions of the fruit indicated in Fig. 5;

Fig. 7 a perspective view of the bar for supporting the inclined belt;

Fig. 8 a diagrammatic view illustrating the manner of discharging fruit from the graders heretofore in use;

Fig. 9 a diagrammatic view illustrating the manner of discharging fruit from my grader;

Fig. 10 a diagrammatic view showing the force represented by the weight of the fruit resolved into component forces acting at the points of support in the graders heretofore in use; and Fig. 11 is a similar view showing the results in my grader, the angle of nip being the same in both cases.

In the drawings like numerals of reference indicate corresponding parts in the different figures.

5 is a frame on which is suitably journalled a roller 6 having a driving pulley 4 secured thereto. Pairs of endless belts 1, 2; $1^a$, $2^a$, and a band 3 are passed round the roller 6 and lie in grooves formed therein. The other end of the belts 1, $1^a$ are passed around a roller 7. The belts 2 and $2^a$ and the band 3 are passed over rollers 8 and 9 and each support a tightening device 10 which includes a pulley and weight. The roller 8 is journalled above the roller 7 whereby the belts 2, $2^a$ are separated gradually towards the vertical from the belts 1, $1^a$.

A chute 11 is provided for feeding the fruit to be graded to both sets 1, 2; $1^a$, $2^a$ of grader belts. The band 3 forms a separator between the two sets of belts and prevents the fruit from travelling along on both the horizontal belts 1, $1^a$ of adjacent graders. When the fruit reaches a point at which it will pass through the gradually widening space between the belts 1, 2 or $1^a$, $2^a$, it rolls on to a discharge chute 12, see Fig. 9. As the fruit is clear of the grader immediately it rolls off the lower belt 1, the chute 12 will be located close to the said belt to eliminate all possibilities of the fruit being bruised on its discharge from the grader.

In the graders heretofore in use, see Figs. 8 and 10, the belts $o^1$ and $o^2$ diverge but as they lie in the same horizontal plane, the fruit, when discharged therefrom, must drop on to a discharge chute $o^{12}$. The distance through which the fruit drops must be sufficient to provide clearance for the passage of the fruit from beneath other fruit being conveyed by the belts. In addition to the fruit being bruised when it strikes the chute $o^{12}$, it is subjected to a high pressure by the belts $o^1$ and $o^2$ both before and during the release of the fruit therefrom. This high pressure is diagrammatically illustrated in Fig. 10 in which a piece of fruit F' weighing say 1 lb. is supported on the horizontally diverging belts, the angle of nip being 150 degrees. By resolving this force C' A' of 1 lb. into component forces acting at the points of support, it is found that the components C' B' and C' D' equal 1.8 lbs. which is the pressure exerted at each of the points of support. As the fruit travels along with the belts, the angle of nip increases and the pressure becomes greater. A further influence tending to mar the fruit is caused by its tendency to roll downwardly through the space between the belts, thus increasing the pressure at the points of support and giving a torsional component to the component forces supporting it. These combined actions are equivalent to applying a force to the fruit of nearly twice its weight and then imparting a twisting motion to the means which is applying the force.

A diagram of the forces acting upon a piece of fruit F about to be discharged from the belts 1, 2 of my grader is shown in Fig. 11, the angle of nip being the same as shown in Fig. 10. The force C A representing the weight 1 lb. of the fruit F is resolved into component forces of 1.3 and .4 lbs at the points of support 1 and 2 respectively. As the angle of nip increases, the pressure at 1 does not increase in the same proportion as the pressure at $o^1$ in the type of grader illustrated in Fig. 10. Further, it will be noted that the torsional effect in my grader is far less than that in the graders heretofore in use.

The belts 1, 1ª are supported by ordinary grooved bars and the belts 2, 2ª are supported by bars 14 having grooves 15 formed therein. While the grooves 15 are straight, the bars 14 are twisted on their axes to provide clearance for the fruit as it moves from the point of feeding to any point of discharge. The bars are secured in any suitable manner to the frame 5 of the apparatus.

What I claim is:

1. A grader including a way having two sides arranged in a warped plane which is approximately horizontal at the feed end of the grader and twists gradually towards a vertical position along the length of the way.

2. A grader including a way having two travelling sides arranged in a warped plane which is approximately horizontal at the feed end of the grader and twists gradually towards a vertical position along the length of the way.

3. A grader including conveyor belts having their receiving portions approximately in the same horizontal plane, the belts being diverged by a gradual separation in a vertical direction to permit a lateral discharge of the articles being graded.

4. A grader including conveyor belts having their receiving portions arranged side by side, one of the belts being arranged substantially horizontal and another of the belts being inclined thereto to permit a lateral discharge of the articles being graded.

5. A grader including conveyor belts having their receiving portions approximately in the same horizontal plane, the belts diverging gradually by relative displacement in a vertical direction to permit a lateral discharge of the articles being graded; and means for supporting the belts adapted at all points to provide clearance for the conveyance of the articles being graded.

6. A grader including conveyor belts having their receiving portions arranged side by side, the belts diverging gradually by relative displacement in a vertical direction to permit a lateral discharge of the articles being graded, and bars for supporting the belts, one of the bars being twisted longitudinally to provide clearance for the conveyance of the articles being graded.

7. A grader including conveyor belts having their receiving portions arranged side by side, the belts diverging gradually by relative displacement in a vertical direction to permit a lateral discharge of the articles being graded, and bars having grooves formed longitudinally thereof to receive the belts, the inclined bar being twisted longitudinally to provide clearance for the conveyance of the articles being graded.

8. A grader including a way having two sides arranged side by side at the receiving end thereof, the sides being separated gradually in a vertical direction to permit a lateral discharge of the articles being graded, and a discharge chute located close to the lower side of the way.

9. A grader including two conveyor belts arranged side by side at the receiving ends thereof, the belts being separated gradually by relative displacement in a vertical direction; a substantially straight guide bar for reinforcing one of the belts against pressure exerted by the articles being conveyed; and a guide bar for reinforcing the second belt, the last mentioned guide bar being twisted spirally throughout its length whereby the contact path between the second belt and the said bar is a straight line and clearance is provided for the conveyance of the articles being graded.

Signed at Highland Park, Ill., this 4th day of December, 1928.

PERCY A. ROBBINS.